United States Patent
Wermeister

(10) Patent No.: US 7,037,051 B2
(45) Date of Patent: May 2, 2006

(54) CUTTING INSERT FOR TURNING AND MILLING

(75) Inventor: Günter Wermeister, Meerbusch (DE)

(73) Assignee: Sandvik AB, Sandviken (SE)

( * ) Notice: Subject to any disclaimer, the term of this patent is extended or adjusted under 35 U.S.C. 154(b) by 79 days.

(21) Appl. No.: 10/863,356

(22) Filed: Jun. 9, 2004

(65) Prior Publication Data

US 2005/0019113 A1 Jan. 27, 2005

(30) Foreign Application Priority Data

Jun. 11, 2003 (DE) .......................................... 103 26 662

(51) Int. Cl.
*B23B 27/14* (2006.01)

(52) U.S. Cl. ........................... 407/113; 407/51; 407/61; 407/103

(58) Field of Classification Search .................. 407/12, 407/40, 42, 51, 53, 61, 103, 113; B23B 27/14
See application file for complete search history.

(56) References Cited

U.S. PATENT DOCUMENTS 5,123,786 A * 6/1992 Yates et al. .................... 407/38
2003/0156910 A1 * 8/2003 Friedman et al. ........... 407/117

* cited by examiner

Primary Examiner—Derris H. Banks
Assistant Examiner—Sara Addisu
(74) Attorney, Agent, or Firm—Burns, Doane, Swecker & Mathis, LLP

(57) ABSTRACT

A cutting insert comprises first and second polygonally-shaped main faces arranged substantially parallel to one another, and a side face structure interconnecting the first and second main faces to define a peripheral edge. At least the first main face includes at least one projection extending to the peripheral edge, the projection formed by: a portion of the first main surface (defining a relief surface), a portion of the side face structure (defining a rake surface), and a portion of the peripheral edge (defining a cutting edge). The insert includes support surfaces defined by a portion of the second main face, and by portions of the side surface structure other than the rake surface.

22 Claims, 10 Drawing Sheets

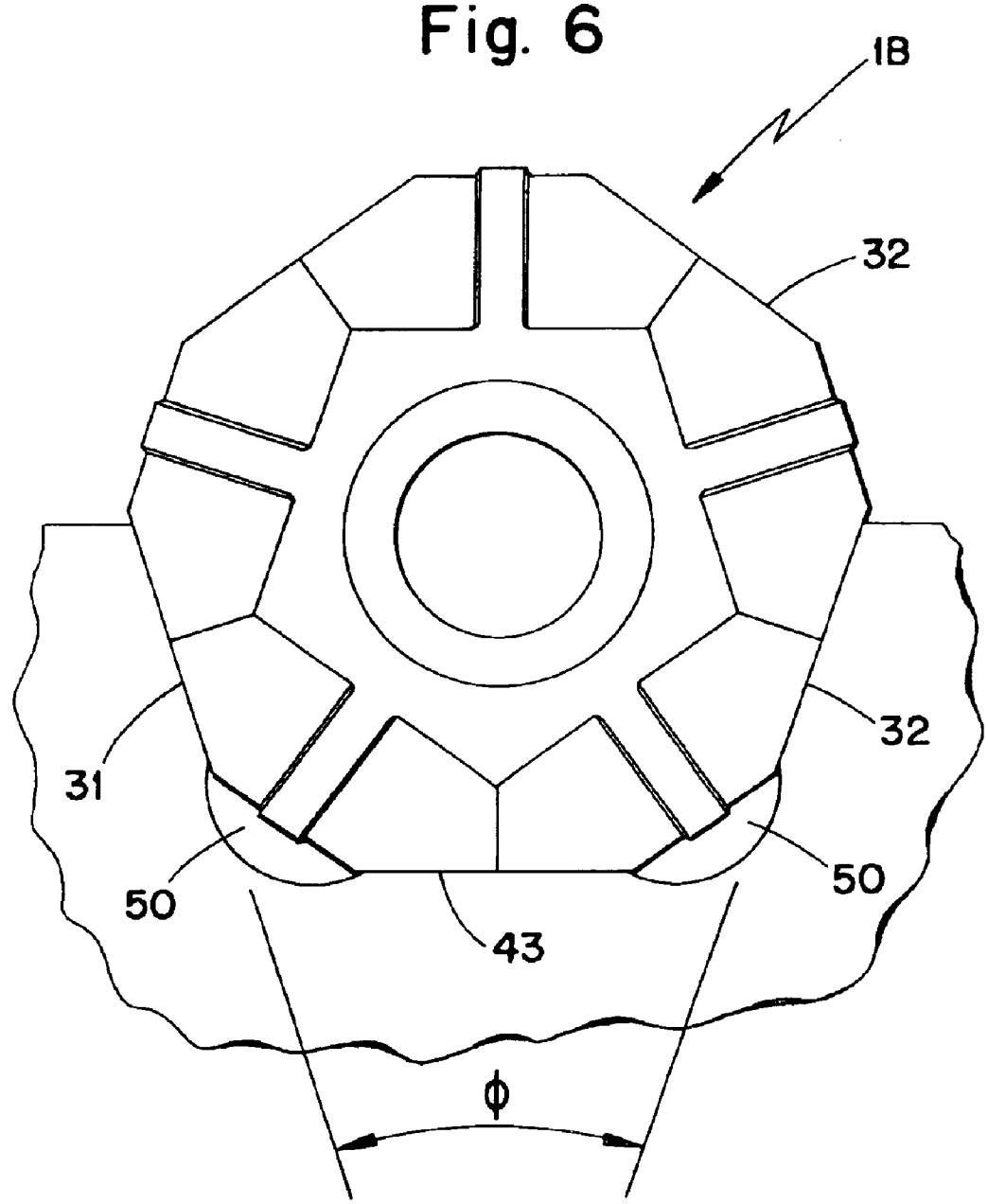

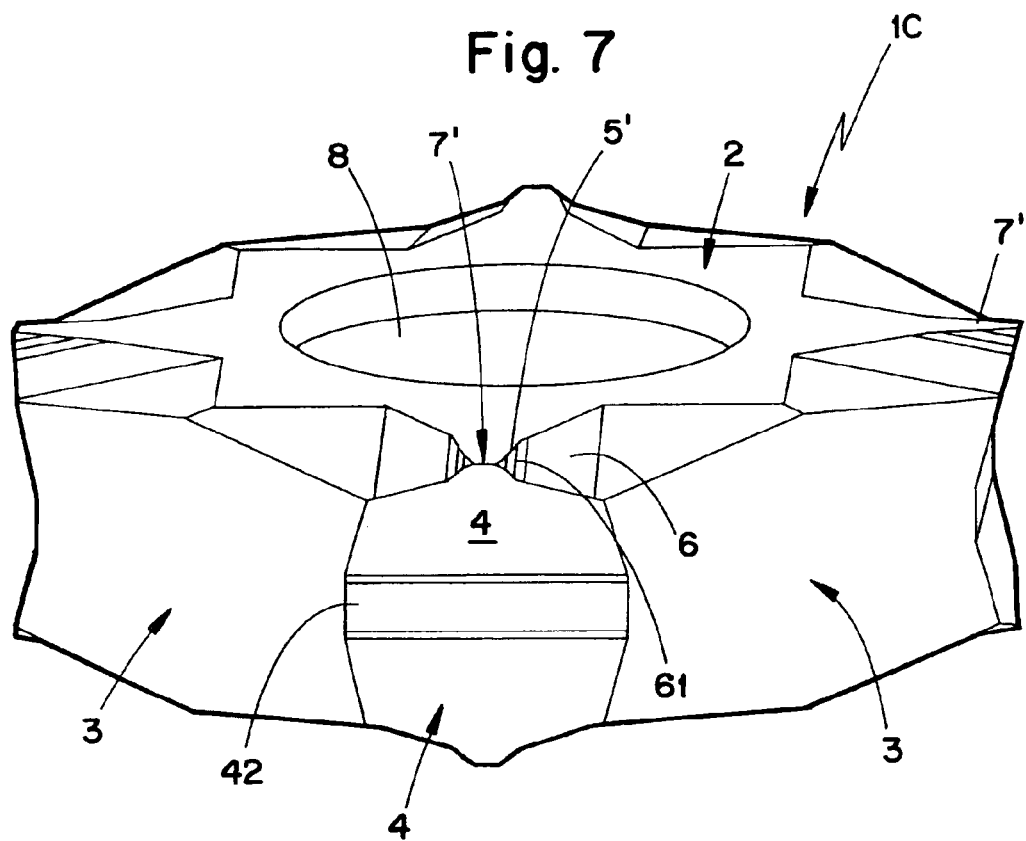

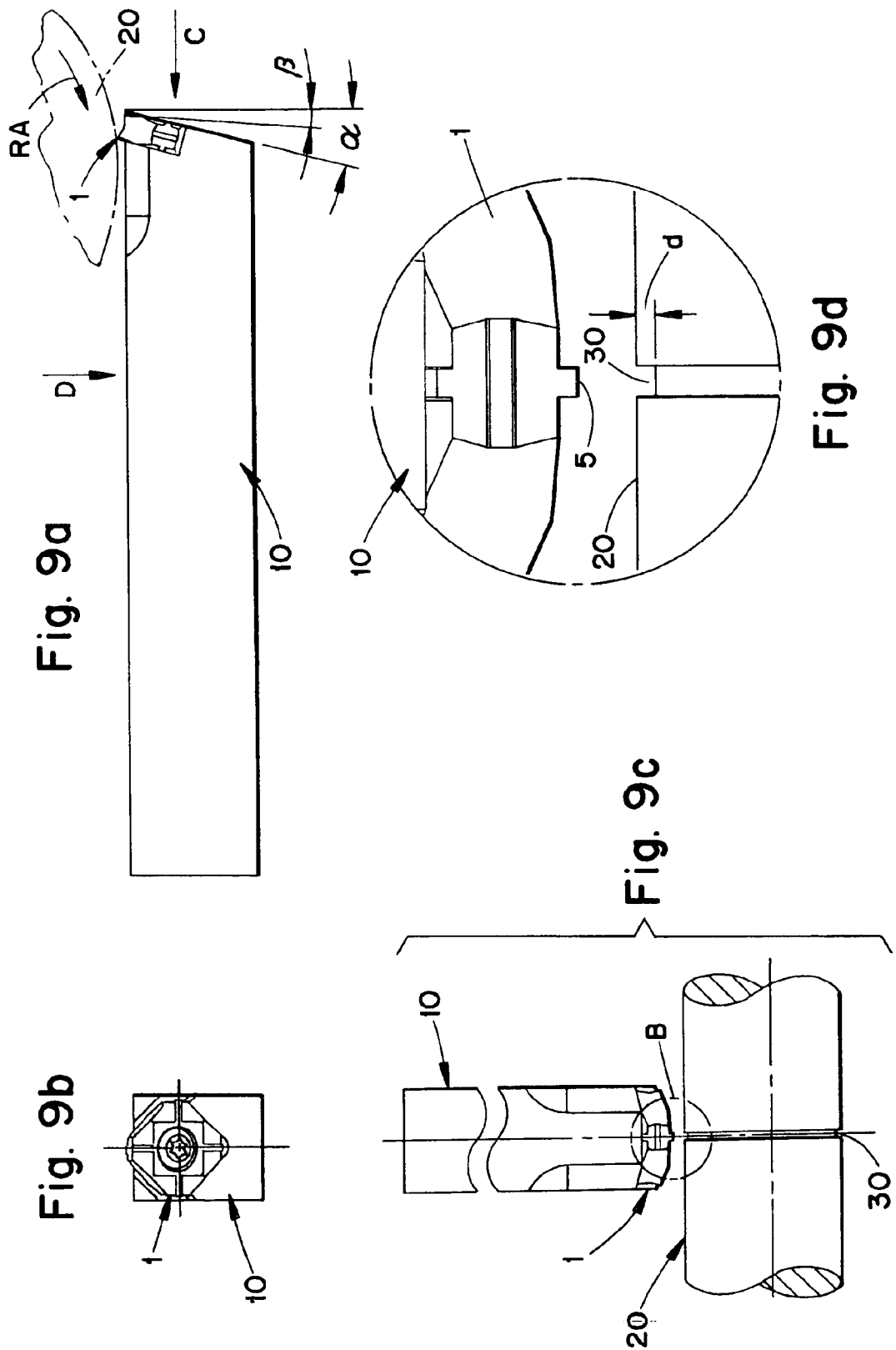

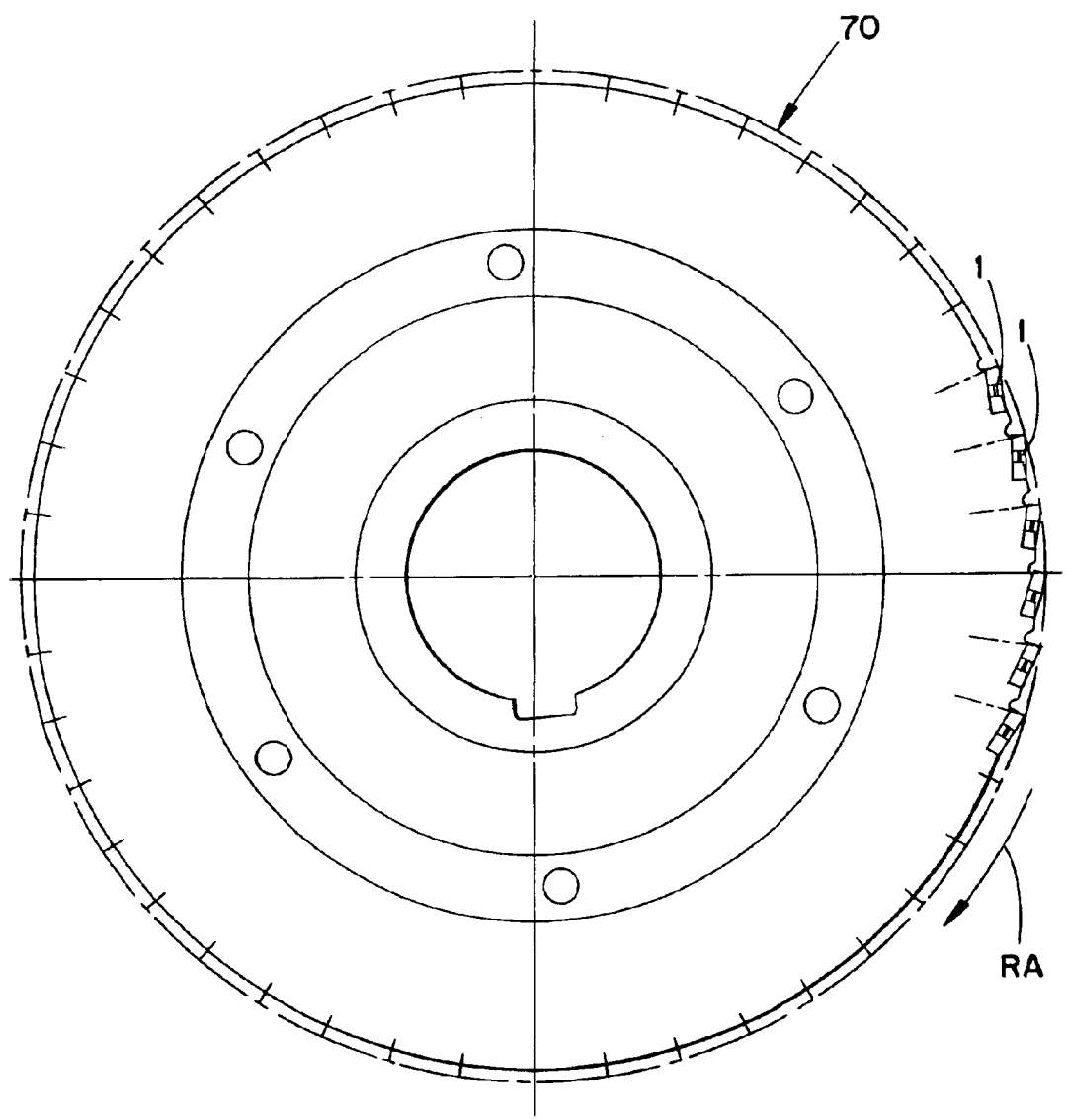

CUTTING INSERT FOR TURNING AND MILLING

This application claims priority under 35 U.S.C. §119 to Patent Application Serial No. 103 26 662.3 filed in Germany on Jun. 11, 2003, the entire content of which is hereby incorporated by reference.

BACKGROUND OF THE INVENTION

The present invention concerns a cutting insert, preferably for turning and/or milling, in the form of a polyhedron with at least two substantially parallel main faces each with a polygonal contour and with a peripheral side wall consisting of several side faces which connect the parallel main faces to each other. At the junction of at least some of the partial side faces with at least one of the main faces are formed cutting edges which have a presettable or predefined profile which is defined by the structuring of the upper and/or lower main face and/or of the side faces in the region of the cutting edge.

Corresponding cutting inserts have already been known for a long time. These cutting inserts are typically made of hard metal and are first pressed from powdered material and then sintered and then, if required, also worked subsequently to obtain their final form. Such cutting inserts are distinguished by particular hardness and durability, but on the other hand also have a lower fracture resistance than tool steel and so, to obtain sufficient stability, are restricted with respect to their geometrical design. The fitting of cutting inserts in cutting tools requires corresponding receptacles and supports on the cutting tools, which have certain space requirements, so that the tools must have corresponding dimensions and designs in order, particularly with exchangeable cutting inserts, to offer sufficient space for one or more cutting inserts and for their fastening elements.

Owing to their extraordinary hardness and the quality (dimensional stability and sufficient fracture resistance) of such cutting inserts which has been improved more and more in the course of time, in the meantime they have gained acceptance in broad areas of metal working as the essential cutting elements, but are still relatively expensive both in manufacture and in practical application, i.e. exchange of inserts which is usually associated with stoppage of production.

For this reason, in the past there has been development of cutting inserts which have several independent cutting edges, only one or some of which engage with the work piece during use of a tool, while, after wear of a cutting edge, the cutting insert can be rotated or turned in the tool in order then to engage with the work piece with a new, unworn cutting edge. It goes without saying that, the more usable cutting edges a given cutting insert has, the more economical it is.

But also essential for the durability of cutting inserts and the performance of cutting tools is the concrete fitted position and support of the cutting inserts on stop faces which are intended to offer support for the cutting insert on as large a surface area as possible, without damaging the non-active cutting edge sections in the process, and with a geometrical arrangement, which transmit the cutting forces arising at the active cutting edge substantially in the form of pressure forces to the tool, and if possible are not intended to act in the form of bending forces on the cutting insert.

In tools which are to be equipped with several cutting inserts, e.g. in milling tools, the concrete geometry and fitted position of the cutting inserts moreover plays in this respect a substantial role as they are to be simple and easy to assemble and yet, to obtain high performance and to reduce the wear and down times, as large as possible a number of cutting inserts are to be accommodated with a correspondingly narrow distance between adjacent cutting inserts on such a tool.

In this case, in practice many concrete operations of machining work pieces require only the production of fine shallow structures or the removal of only a slight excess size on a concrete work piece. For instance, camshafts of which the central shaft section consists of a relatively thin-walled tube on which the cams are mounted have in the meantime been developed for motor vehicle engines. For reliably fastening the cams to the tube, relatively flat grooves must be formed in the outer wall of the tube. This can be done, for example, as in the traditional manufacture of camshafts, by means of side-milling cutters which at their outer circumference are equipped with corresponding cutting inserts for forming such grooves.

The present invention is particularly suitable for such applications. Traditionally, corresponding grooves were made with so-called grooving inserts, or grooving plates which in general have only one or two cutting edges. Such plunging plates are difficult to fit and should be exchanged for new plunging plates frequently due to their small number of cutting edges.

Compared with this state of the art, it is the object of the present invention to provide a cutting insert and corresponding cutting tools which prove to be particularly favorable for forming shallow structures.

SUMMARY OF INVENTION

With respect to the cutting insert, this object is achieved by the fact that:
- some of the partial side faces of the cutting insert form rake surfaces,
- the section of the main face which with such a partial side face forms a cutting edge serves or is designed as a relief surface, and
- some of the side faces and some of the main faces form contact faces.

According to the position of the relief surfaces and rake surfaces, therefore, these are cutting, inserts which are provided for a so-called tangential fitted position, which means that the main face of the cutting insert which serves as a relief surface, apart from the required clearance angle, runs roughly tangentially to the work piece surface when the cutting insert concerned is in engagement with the work piece.

As the main faces have a polygonal contour and the peripheral side wall accordingly consists of a plurality of side faces, according to the number of side faces a certain proportion of them, preferably exactly half, can be designed as rake surfaces, while the other half are in each case designed as contact faces. Preferably, the polygonal course defining the contour of a main face has at least six edges and preferably eight or more edges, so that the peripheral side wall breaks down into a corresponding number of side faces and for example at least three, preferably at least four of these side faces are designed as rake surfaces, while the remaining three or four side faces (or even more) are designed as contact faces. Preferably, contact faces and rake surfaces are arranged alternately along the circumference of such a cutting insert and in each case angled to each other, wherein the relative angle with a substantially symmetrical design of the polygon occurs as an nth part of 360° if a total of n partial faces are provided along the circumference.

In the preferred embodiment of the invention, the side contact faces are clearly separated from the rake surfaces, and this separation is best effected by the fact that the contact faces are designed at an angle to the rake surfaces. Basically, it would also be conceivable to use extensions of the rake surfaces as contact faces, or to provide clearly rounded junctions between rake surfaces and contact faces, or to design some of these faces as faces which are curved or rounded in a plan view of the main face. In particular the contact faces are, however, preferably designed as planar faces in order to ensure exact positioning of the cutting insert in a corresponding receptacle or pocket on the respective tool or cutting insert holder. It would, however, be quite possible for the cutting edges to be curved in a plan view of the main face, wherein both concave and convex shapes of the cutting edges and hence of the rake surfaces are conceivable.

Portions of the main faces form, in the regions where the main faces intersect with the rake surfaces, relief surfaces. An embodiment of the invention in which at least one central section of the main face is designed as a contact face is, however, preferred in this case. It goes without saying that the main face used in each case as a contact face adjoins the respectively non-active cutting edges in a concrete starting condition, whereas the main face associated with an active cutting edge has in each case only a free-face function and then does not act as a contact face.

Particularly preferred is an embodiment of the cutting insert according to the invention in which the main face at least in the region of the cutting edges has hollows or flattened portions and/or elevations which by intersection with the rake surface or faces define a cutting edge profile.

In a variant of the present invention in which the central section of the main face defines a plane, the sections or structures of the main face which define the cutting edge profile also extend outwardly beyond the plane of the central section. In this case, however, it should be ensured that, in a fitted position in which the central section of the main face forms a stop face, the corresponding undercuts corresponding to structures which protrude beyond the main face are in the cutting insert receptacle of the tool, so that the non-active cutting edges are exposed in the corresponding receiving compartment of the tool and not subjected to supporting forces.

A preferred embodiment of the invention is, however, one in which the main face in the region of a cutting edge does have substantially symmetrically arranged flattened portions between which remains an elevation preferably arranged centrally (referred to the arrangement along the cutting edge), but in which the surface of this "elevation" lies in a common plane with the central section of the main face and forms a relief surface. Such a cutting insert can, for example, be made from a blank having a main face which is planar throughout and has a polygonal contour, wherein, for example, on every other side which is to serve as a cutting edge, with the exception of a region located approximately in the middle of the side serving as a cutting edge, flattened portions are cut in the main face (or from the outset the cutting insert is made with corresponding flattened portions during pressing and sintering), wherein it is of no importance here how far these flattened portions also extend into the region of the adjoining contact faces. In any case the flattened portions should extend so far on both sides of the region left approximately in the middle of a rake surface or cutting edge, that at least in the central section a cutting edge remains.

Appropriately, along the side wall of the cutting insert rake surfaces and contact faces are arranged alternately to each other, and in each case two contact faces closest to each other should form an angle of at least 45° and less than 180° with each other. In this way the contact faces define a wedge within a wedge angle range of between 45° and less than 180°, wherein angles between two active contact faces respectively within a range from 60° to 120° are preferred because such angles between contact faces allow optimum precision of positioning.

This means that the cutting insert in a plan view of the main face should have at least six and preferably not more than twelve edges, wherein, however, variants in which not two closest contact faces act respectively as active contact faces, but between two active contact faces of the side wall a further, non-active contact face can also be located (in addition to at least one rake surface), are conceivable too.

In the preferred embodiment, the cutting insert according to the present invention has the basic shape of a square prism, the edges of which are beveled, wherein either the remaining side faces of the prism or the above-mentioned beveled faces are designed as rake surfaces, and the remaining faces are designed as contact faces.

Such a cutting insert is, as a result, octagonal in a plan view of the main face, wherein, however, the rake surfaces and the contact faces do not necessarily have to correspond to sides of equal length and moreover are arranged alternately along the circumference of the side wall on the cutting insert.

Particularly preferred is an embodiment of the invention in which the rake surfaces form with the relief surfaces of the respectively associated main face an angle of less than 90°, to obtain a positive cutting edge geometry. This angle between rake surface and relief surface, which is also referred to as the "wedge angle", is in the preferred embodiment of the invention between 70° and 80°. Appropriately, such a cutting edge shape is achieved by corresponding hollowing out of those side faces which with the main faces form the machining edges. This hollowing out could firstly be obtained easily by means of a suitably concave design of the rake surfaces (considered in a section perpendicularly to the main faces), but it is preferred that the side faces which form rake surfaces are in each case formed from planar face sections, wherein, particularly when the cutting insert is a double-sided cutting insert in which cutting edges are formed at the junction of the rake surfaces with both opposed main faces, the rake surface sections directly adjoining the opposed main faces or relief surfaces converge in a wedge shape with a wedge angle between preferably 140° and 160°, wherein, however, the base of this wedge again consists of a planar face segment which is oriented perpendicularly to the two main faces. Concretely, therefore, the side faces forming the rake surfaces consist of at least three face segments which are arranged symmetrically to the centre plane of the cutting insert, wherein a central face segment extends substantially perpendicularly to the upper and lower main faces, while the face segments adjoining them and intersecting with the main faces and/or their flattened portions form, with the plane of the respectively adjoining main face, an angle of less than 90°.

Further, a preferred embodiment of the invention for certain applications is one in which the junction of a central elevation of the main face with the side flattened portions runs along an oblique or rounded face and not along a sharp, discontinuous or step-like contour, so that correspondingly the contour of the cutting edge is formed by the intersection of the rake surface with the central elevation and its junction with the flattened portions.

As already mentioned, the present invention also concerns a lathe or milling tool which is designed for the cutting inserts according to the present invention and which has at least one and, in the case of a milling tool, preferably several receptacles for a cutting insert, as described above. With such a tool, the receptacle should be designed for tangential fitting of the cutting insert, wherein a main stop face of the receptacle is designed for contact with at least the central section of the main face of the cutting insert, while perpendicularly to this main stop face of the receptacle are provided two further stop faces at an angle to each other, which form with each other an angle of at least 45° and less than 180°, preferably not more than 135°, and are provided for stopping two contact faces of the cutting insert which enclose between them at least one rake surface which is in turn held in an undercut between the stop faces of the tool.

According to an embodiment of the present invention, such a cutting tool is the cutting insert holder of a lathe tool.

According to an alternative embodiment of the present invention, the cutting tool is a cylindrical, rotating milling tool on whose circumferential surface can be fitted tangentially the cutting inserts described in detail above.

DESCRIPTION OF THE DRAWINGS

Below, embodiments of the invention will be described with reference being made to the accompanying drawings, where:

FIG. 3a is a sectional view taken along the line B—B in FIG. 2a,

FIG. 3b is a perspective view of the insert of FIG. 2a,

FIG. 3c is another perspective view of the insert of FIG. 2a,

FIG. 6 is a plan view of a third embodiment of a cutting insert according to the invention, with the insert mounted in a holder, FIG. 7 is a perspective view of a fourth embodiment of a cutting insert according to the invention, FIG. 9a is a side elevational view of the insert and holder of FIG. 8a, also showing a workpiece, FIG. 9b is a view of the insert and holder of FIG. 9a as viewed in the direction of Arrow C in FIG. 9a.

FIG. 9c is a view of the insert and holder of FIG. 9a plus a workpiece, the insert and holder being viewed in the direction of arrow D in FIG. 9a, FIG. 9d is an enlarged fragmentary view of a section B of FIG. 9c, FIG. 10 is a plan view of a milling disc type of holder, with inserts according to FIG. 1 occupying some of the seats thereof.

DESCRIPTION OF PREFERRED EMBODIMENTS

Figure 1:
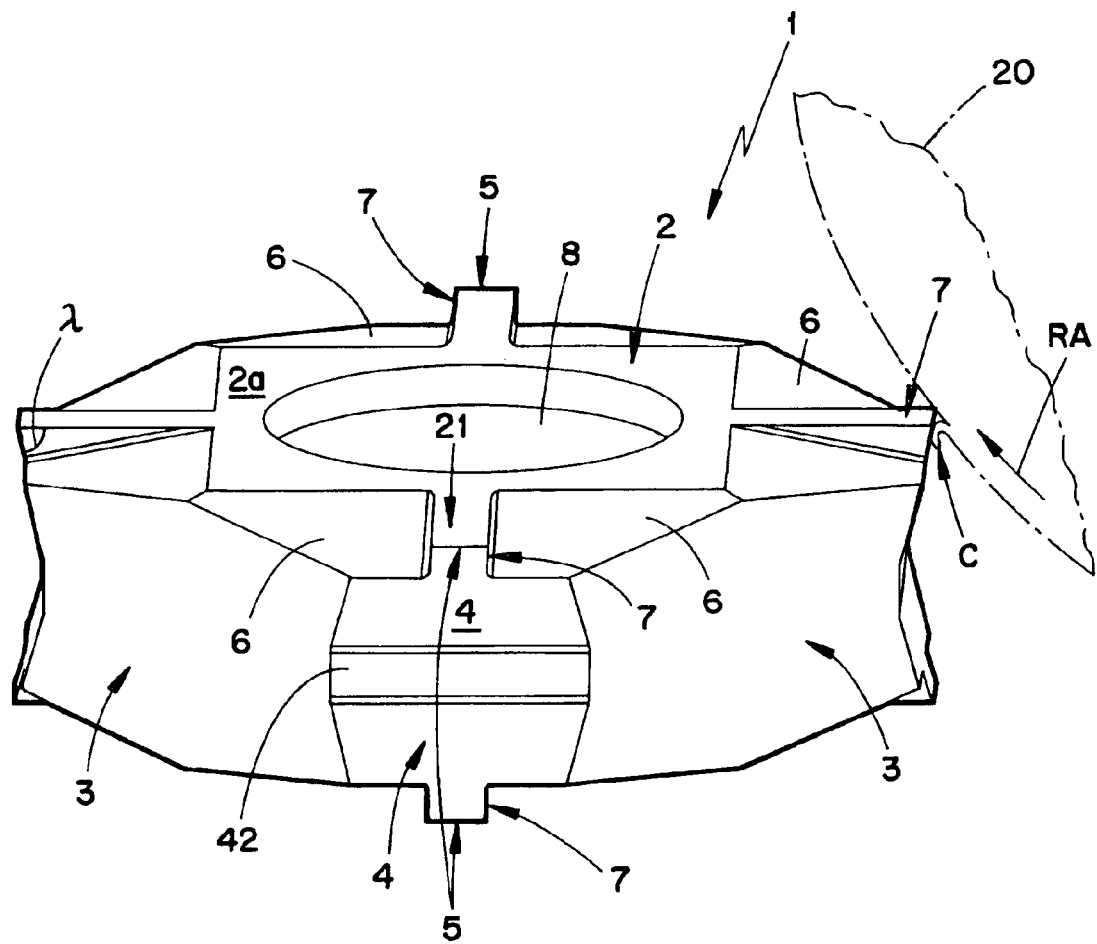
FIG. 1 a perspective view of a first embodiment of a cutting insert according to the present invention, with a workpiece shown in broken lines.

In FIG. 1 and in FIGS. 2a, 2b and 3a–3c can be seen the cutting insert 1 which has the basic shape of a polygonal parallelepiped.

The cutting insert has first and second (i.e., upper and lower) main faces 2, 2' interconnected by a side face structure 3 to form therewith a peripheral edge 5. The plane of the upper main face 2 is substantially defined by a central contact face 2a which surrounds a central fastening bore 8. The upper main face 2 includes branch surfaces 21, each of which projects from the center of one side of the contact face 2a. The branch surfaces define relief surfaces to respective narrow cutting edges 5 formed at the end of the branch surfaces. The branch surfaces have been made as a result of the fact that the upper face 2 on both sides of such a branch surface 21 has recesses, preferably in the form of flattened portions 6 which are declined at an angle δ (FIG. 2b) of between 10° and 25° relative to the central face 22, so that in the middle between two flattened portions 6 a projection 7 is formed which defines a branch surface 21. All the junctions in edge regions, for example, at the junction of the projection with the flattened portions 6, are preferably rounded with a small radius, as shown at various locations in the figures by indicating the letter R (R2, R3), which are typically within a range between 0.1 and 1 mm.

Figure 2A:
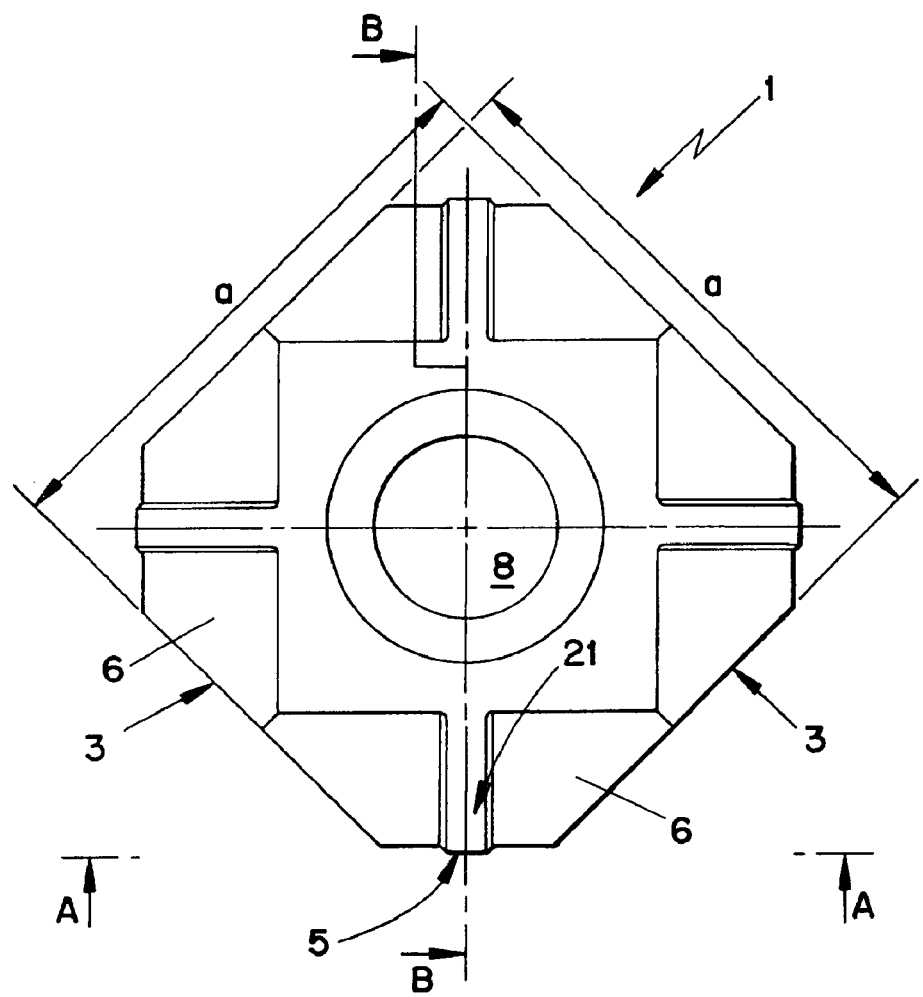
FIG. 2a is a plan view of the insert of FIG. 1.
Figure 2B:
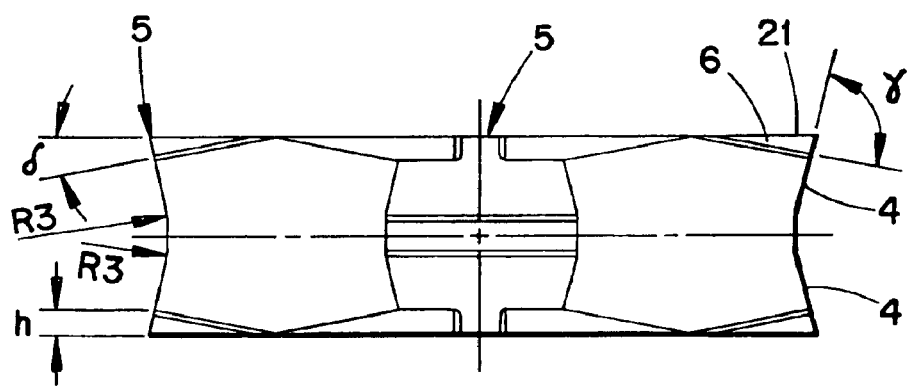
FIG. 2b is a side elevational view of the insert of FIG. 2a taken in the direction of arrows A—A.
Figure 4:
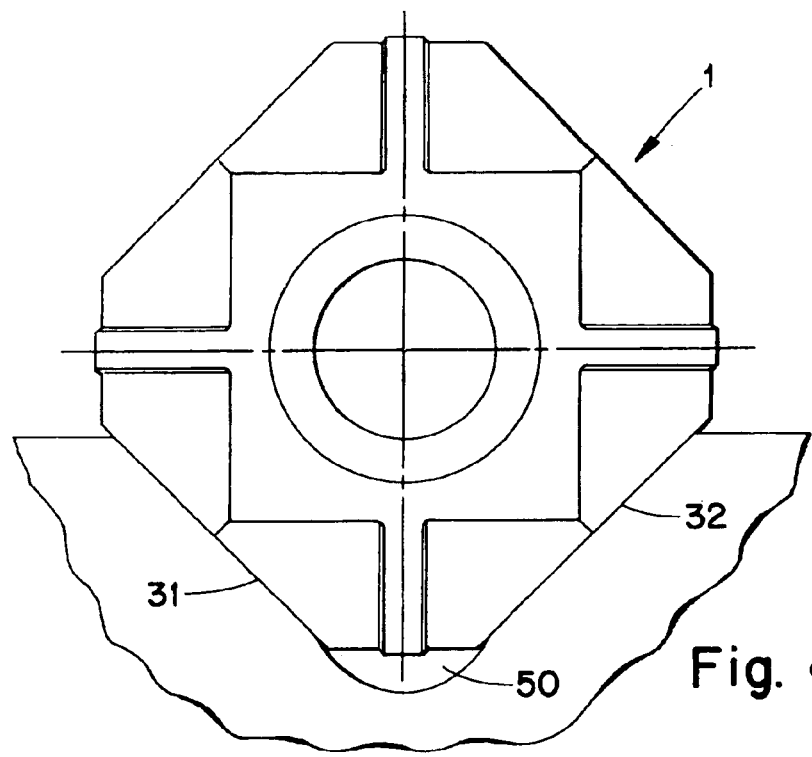
FIG. 4 is a plan view of the insert according to FIG. 1, with the insert mounted in a holder.

At best, in the plan view from above according to FIG. 2a or also in FIG. 4 it can be seen that the cutting insert in this embodiment has a substantially octagonal shape with sides 3, 4 of different length (which shape would also be considered as a square shape having a side length a with beveled edges), as becomes particularly clear in FIG. 2a. The cutting insert is shown true to scale in the figures except for unavoidable inaccuracies due to copying etc., and the dimension a in FIG. 2a is about 16 mm, for example. Naturally, other absolute dimensions are possible too, and also the relative dimensions can further vary within certain ranges, even though the dimensional ratios shown above are preferred. Due to the beveling, the shorter sides 4 of the octagon are formed, which define rake surfaces and define a part of the projection 7 which protrudes upwards, (or downwards in the case of the lower main face) beyond the flattened portions 6. The sides 3 of the square shape which are left in between the bevels 4 form the longer sides of the octagon.

Importantly, as can further be seen in the perspective view of FIG. 1 and also in FIGS. 2b, 3b, 8a and 9a, these longer sides 3 are designed as contact (support) faces 3, while the shorter sides 4 are designed as rake surfaces, i.e., surfaces contacted by chips C (see FIG. 1). The branch surfaces 21 would constitute relief surfaces. Thus, with reference to FIGS. 1 and 9a, a workpiece 20 shown therein would be rotated clockwise during a cutting operation as shown by the rotation arrow RA. The branch surfaces 21 thus define clearance surfaces. As can further be seen with the aid of the figures, the cutting inserts are designed as double-sided cutting inserts, i.e. the upper main face 2 is designed identically to the corresponding lower main face and arranged in such a way that the cutting insert is designed inversely symmetrically in relation to a centre plane running parallel to the upper contact face 22. This does not, however, exclude the possibility of an embodiment of the cutting insert in which the cutting edges 5 of upper and lower main faces are not inversely symmetrical, but turned through e.g. 45° relative to each other. Also the contact faces and rake surfaces would then be offset on the opposite sides and could in each case be formed by (for example, triangular) facets on the peripheral side wall.

In the embodiments shown here, the wedge angle λ between a rake surface 4 and the upper relief surface 21 of each projection 7 is typically between 65° and 80°, preferably around 75°, and the rake surface 4 runs at a slightly larger wedge angle γ of e.g. 85° to the beveled faces 6 on both sides of the projection 7. The inward inclination of the rake surfaces 4 relative to the upper relief surfaces 21 or relative to a perpendicular to these relief surfaces results, at the cutting edge 5, in a positive cutting edge geometry.

Even though the rake surface 4 could be made as a hollowed-out face which is circularly or elliptically concave in cross-section (perpendicularly to the main face and to the rake surface), nevertheless a preferred embodiment is one in which the rake surface regions 4 directly adjoining the cutting edges 5 are designed as planar face segments which are connected to the further face segment serving as a rake surface 4 by a main face segment 42 which on the respectively opposite side of the cutting insert adjoins a corresponding cutting edge 5. The planar face segment 42 between the two rake surfaces 4, 4 runs in turn perpendicularly to the planar upper contact face 22 and the corresponding lower contact face.

Further details of the cutting insert are shown in FIGS. 2a, 2b and 3a–3c. FIG. 2a shows very clearly the square basic shape with the beveled edges, from which the octagonal shape arises. As can be seen, on each side of the cutting insert are provided four projections 7 each with a corresponding cutting edge 5, so that the cutting insert on front and rear sides has a total of eight projections 7 with a total of eight cutting edges 5. The side faces respectively enclosing a rake surface section form contact faces 3 which support the cutting insert held in a cutting tool during machining.

Figure 3A:
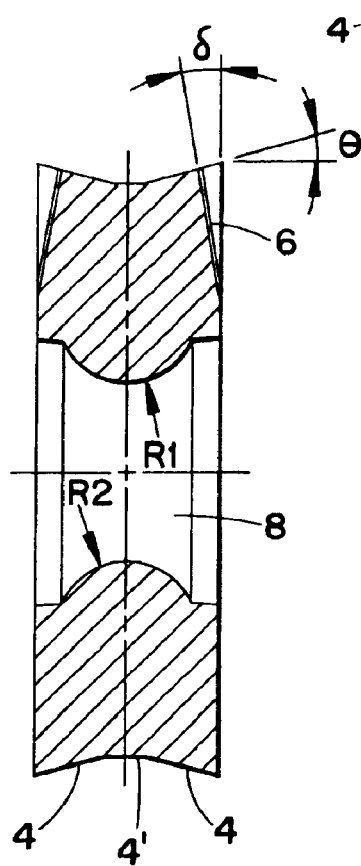
Figure 3B:
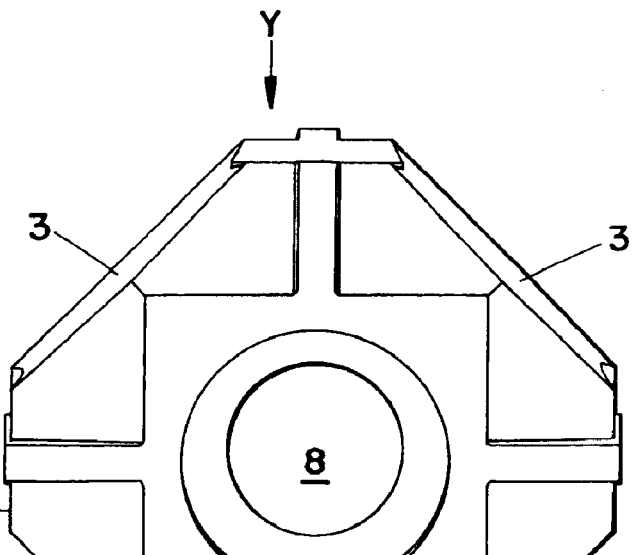
Figure 3C:
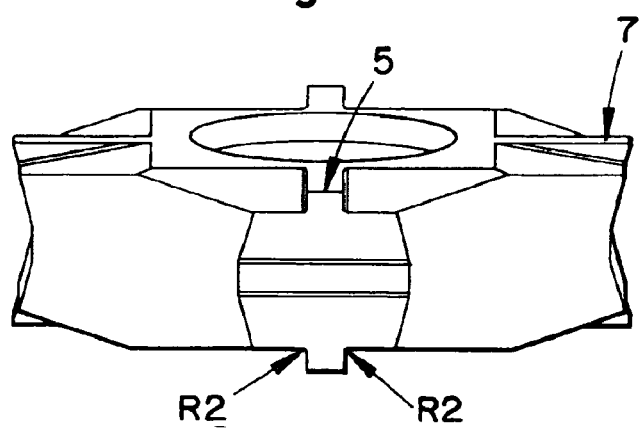

With the aid of the side view 2b and the sectional view 3a it can be seen that the faces 6 in the embodiment shown here are inclined by the angle δ about 10° relative to the upper contact face 22, while the rake surfaces 4 are inclined by an angle θ (FIG. 3a) of about 15° relative to a perpendicular to the upper and lower contact faces 22, i.e. with the upper relief surfaces 21 form the wedge angle λ of 75° and also with the beveled faces 6 still form an acute angle γ of about 85°. The fastening bore tapers from both main faces along a convex curve of circular cross-section, as shown in FIG. 3a, with a radius R1 of about 2 mm. The height h (FIG. 2b) of the projection 7 in the region of a cutting edge 5, i.e. the distance from the cutting edge 5 to the flattened portions 6 provided on both sides of the projection is typically between 0.2 and e.g. 2 mm, wherein this dimension depends ultimately on the size of the cutting insert and on the extent and inclination of the flattened portions 6. Concretely, in the embodiment shown this distance h is slightly less than 1 mm, e.g. 0.6 to 0.8 mm, so that with such a cutting insert, grooves can be made with a slightly lesser depth, that is, approximately of the order of about 0.7 mm. But it goes without saying that the concrete dimensions and angles of such a cutting insert can be varied within wide ranges.

Figure 5:
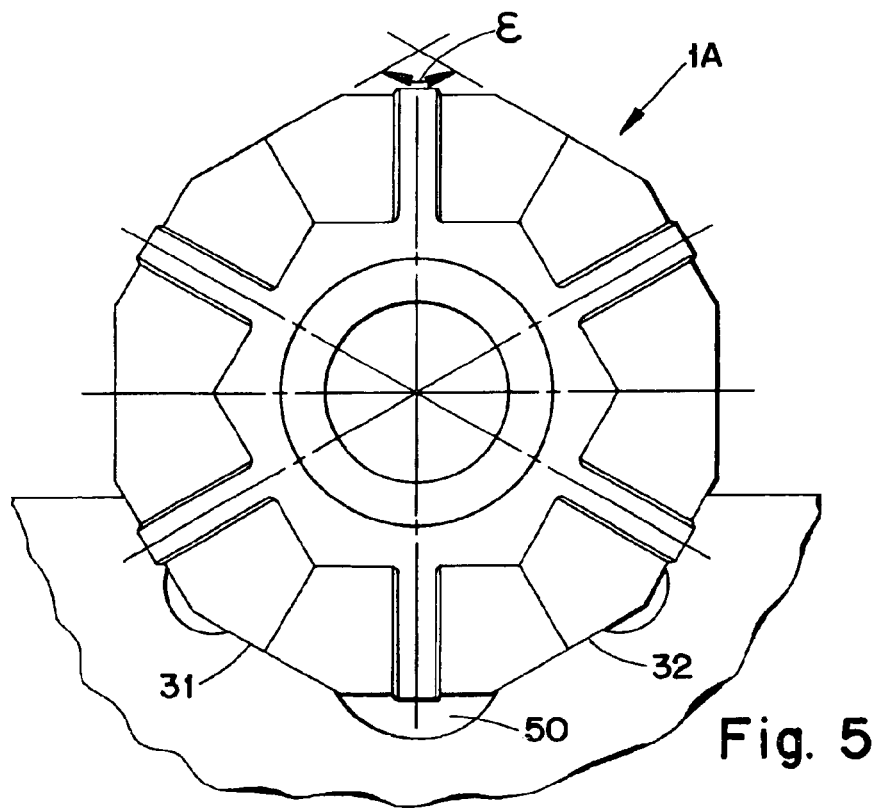
FIG. 5 is a plan view of a second embodiment of a cutting insert according to the invention, with the insert mounted in a holder.

With the aid of FIGS. 5 and 6 it can be seen that, in addition to the octagonal basic shape of a cutting insert already described, other polygonal basic shapes can be produced, e.g. an insert 1A with a dodecagonal basic shape (FIG. 5) or an insert 1B with a decagonal basic shape as in FIG. 6, wherein in each case accordingly five or even six cutting edges can be accommodated on one side. The cutting inserts are here shown schematically in an insert seat having corresponding stop faces against which the contact faces 31, 32 of the cutting inserts abut. The cutting edges 5 which are in each case diametrically or almost diametrically opposite an active cutting edge 5, and also the rake surfaces 4 adjoining them, which are located within the respective insert seat, are in each case held in an undercut 50 for their protection.

With the dodecagonal basic shape as in FIG. 5, the mutually adjacent side contact faces 31, 32 form a relatively large angle of 120° with each other, which is not a fundamental drawback, however, because reproducible positioning and support are always obtained by the additional central fastening bolt.

With the decagonal basic shape (FIG. 6), the contact faces 31, 32 which are simultaneously to be brought into engagement with the stop faces of a cutting insert receptacle form a relatively acute angle φ of only about 36° with each other, and the further contact face 43 could even lead to overdefinition of the insert position, which would require very precise manufacture of the insert seat. However, in such a case a virtue can be made out of need, by making the stop faces, which correspond to the contact faces 31, 32, with a slightly smaller wedge angle φ of 35.5°, for example, so that they are slightly expanded by the correspondingly slightly oversized cutting insert while it is pressed in, until the face 43 which strikes the bottom of the insert seat prevents further insertion of the cutting insert. In this way likewise very precise positioning of the cutting insert 1B is achieved, which is also held fast in its seat better by the clamping force of the side stop faces.

The alternative insert 1C as shown in FIG. 7 differs from the embodiment shown in FIGS. 1 to 4 essentially only in the beveled or slightly curved junction of the upper relief surface 21 with the side flattened portions 6, so that accordingly the cutting edge 5 has oblique or rounded auxiliary cutting edges 5' which form the junction with the flattened portions 6, so that a structure obtained by such a cutting edge does not, as in the case of the first-mentioned embodiment, have a rectangular cross-section, but either a trapezoidal or more generally a trough-shaped cross-section. A corresponding structure can be seen on the structure of a groove in FIG. 11c made in a workpiece 20a with such a cutting insert, for example.

Figure 8A:
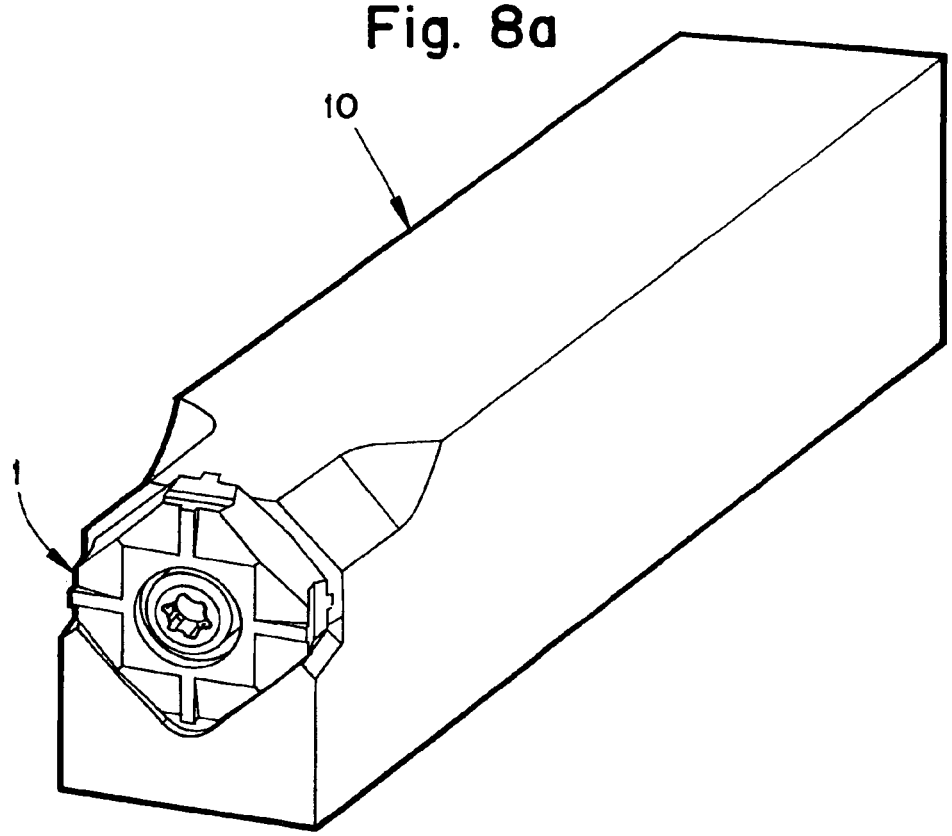
FIG. 8a is a perspective view of the insert of FIG. 1 mounted in a lathe-type of holder for use in a turning operation.
Figure 8B:
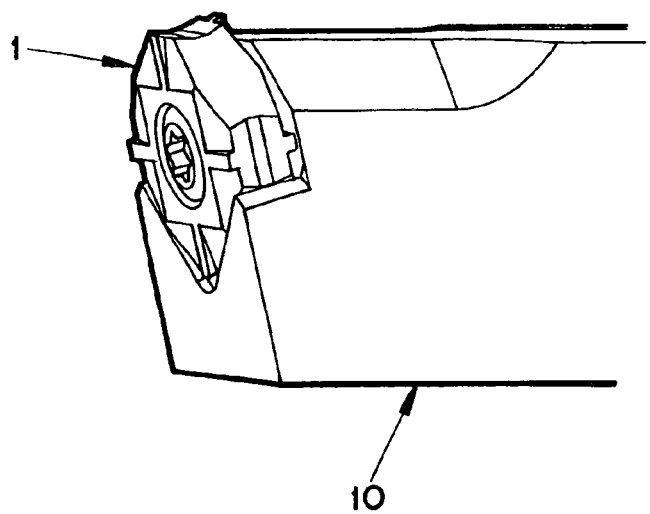
FIG. 8b is a fragmentary view of a portion of FIG. 8a as viewed from a slightly different angle.

FIGS. 8a, 8b and 9a–9c show a cutting insert according to the invention which is mounted on a lathe tool. FIGS. 8a, 8b show a lathe tool with the cutting insert according to the invention in two different perspective views.

In FIGS. 8a, 8b and 9a–9c can be seen clearly the so-called "tangential" fitted position of the cutting insert and the precise angles α, β, as adjusted for the relief surfaces 21 and the flattened portions 6, with a slight inclination of 15% (=α) of a front, end stop face relative to the tangent to a corresponding work piece, against which stop face the central contact face 2 of the cutting insert abuts in the fitted state. The inclination of this end stop face of the lathe tool roughly corresponds to the inclination of the rake surface relative to a perpendicular to the contact face 2, so that the rake surface lies roughly horizontally and substantially parallel to the direction of advance of the corresponding lathe tool. The fitted position is shown precisely in particular in FIG. 9a with the corresponding angles.

In order to be able to bring one of the cutting edges 5 into engagement with the work piece, the cutting insert is mounted as shown in detail in FIGS. 9a, 9b. Here the result is still a positive cutting edge geometry which, as is known, ensures low cutting forces. FIG. 9c shows how the cutting insert 1 is delivered by means of a lathe tool 10 to a work piece 20 to produce a groove 30. FIG. 9d represents "detail B" in FIG. 9c. As can be seen, the groove 30 can at the most have a depth d which corresponds to the height h of the cutting edge 5 above the flattened portions 6. This manner of fitting a cutting insert is called "tangential" because the main faces of the cutting insert, i.e. the upper face 2 and accordingly also the opposite lower face, run approximately tangentially to the work piece surface being machined, as these faces simultaneously define the plane of the relief surfaces 21 which deviate from the exactly tangential orientation by only a small clearance angle.

As can further be seen with the aid of FIGS. 8a, 8b and 9a–9c, three contact faces of the cutting insert which are in each case furthest away from a cutting edge, form the supporting faces in a corresponding tool receptacle. Those supporting faces are: the central contact face 2 on the side of the cutting insert opposite the active cutting edge, and the side contact faces 3 which adjoin not the active rake surface 4, but the diametrically opposed rake surface 4. Due to support or contact faces positioned in this way, a very precisely defined and firm plate seat is achieved. The cutting insert 1 is attached to the cutting insert holder by means of a fastening bolt which passes through the central fastening bore 8.

In FIG. 10 can be seen a side-milling cutter 70 in a side view, which for hard-facing is equipped with a plurality of reversible cutting inserts 1 according to the invention. In the practical example shown, up to forty-four reversible cutting inserts 1 can be attached in a tangential fitting to the outer circumference of a side-milling cutter. "Tangential fitting" here too again means that the main faces 2 run approximately tangentially to the circumference of the side-milling cutter and are angled relative to this tangential orientation by only the required clearance angle. This tangential fitting advantageously makes it possible for the fastening bolts to be mounted substantially in a radial direction, so that a relatively small distance can be maintained between adjacent cutting inserts, and so the active cutting edges of the cutting inserts are arranged in quick succession one behind the other. Such a side-milling cutter typically has a diameter of several hundred mm.

Figure 11A:
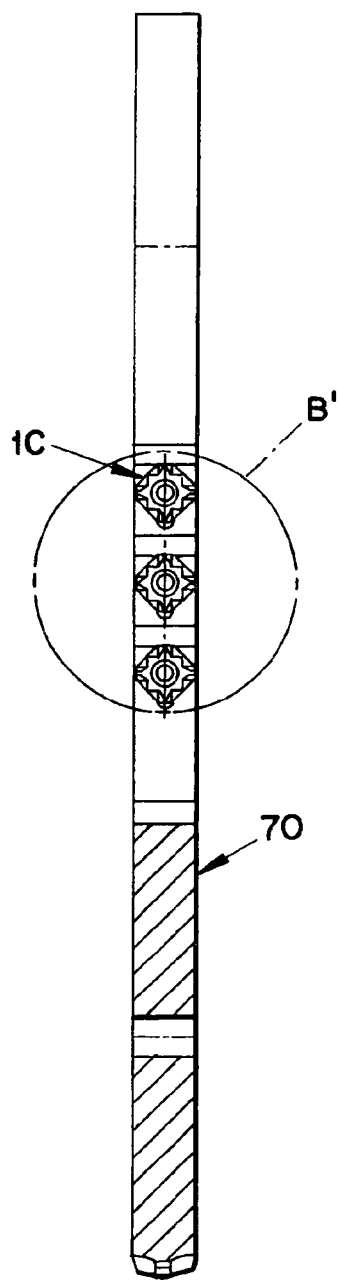
FIG. 11a is a side elevational view, partially sectioned, of the milling disc of FIG. 11a, FIG. 11b is an enlarged fragmentary view of a section B' in FIG. 11a, and FIG. 11c depicts a workpiece having a groove machined therein by the insert according to FIG. 7.
Figure 11B:
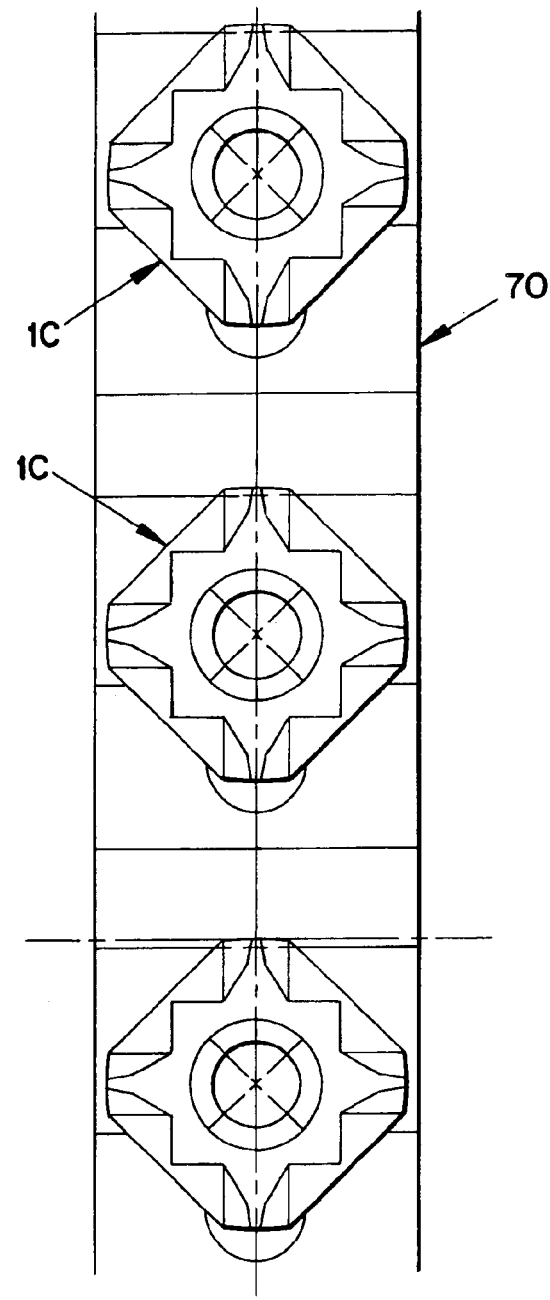

FIG. 11a shows a plan view of the circumference of such a side-milling cutter 70, only three of the cutting inserts 1 arranged along the circumference being shown in a detail B'. This detail B' is shown in FIG. 11b again on a larger scale. In this case the cutting insert 1C shown in FIG. 7 has been used for the side-milling cutter shown. As can be seen in FIG. 10, in this case too the individual cutting inserts are inclined inwards with their main faces, which simultaneously define the plane of the relief surfaces, relative to a tangent to the circumference of the side-milling cutter, wherein the direction of rotation of the side-milling cutter during operation is anti-clockwise with the fitting shown.

Figure 11C:
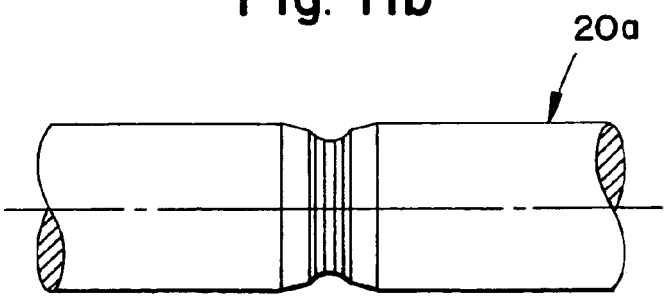

In FIG. 11c can be seen the profile which can be manufactured by means of such a side-milling cutter 70 and the cutting insert 1C shown in FIG. 7 on a shaft 20a, for example a camshaft or crankshaft. During such manufacture, the shaft and the side-milling cutter turn simultaneously, the corresponding peripheral groove being made in the course of a single revolution of the shaft.

It will be appreciated that the recesses need not be in the form of planar flats 6, but could assume other shapes, e.g., they could constitute concavities, in order to form the projections 7.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A cutting insert comprising first and second polygonally-shaped main faces arranged substantially parallel to one another, and a side face structure interconnecting the first and second main faces to define a peripheral edge, at least the first main face including at least one projection extending to the peripheral edge, the at least one projection comprised of:
    a portion of the first main surface, defining a relief surface,
    a portion of the side face structure, defining a rake surface, and
    a portion of the peripheral edge, defining a cutting edge;
    the insert including support surfaces defined by: a portion of the main surface, and portions of the side surface structure other than the rake surface.

2. The cutting insert according to claim 1 wherein the portions of the side surface structure that define support surfaces are separated from the rake surface.

3. The cutting insert according to claim 1 wherein the at least one projection comprises a plurality of projections.

4. The cutting insert according to claim 3 wherein the projections are oriented at an angle to one another.

5. The cutting insert according to claim 4 wherein the angle is ninety degrees.

6. The cutting insert according to claim 1 further including recesses disposed in the first main surface and extending to the peripheral edge to define the at least one projection therebetween.

7. The cutting insert according to claim 6 wherein the recesses extend inwardly from the peripheral edge to a location short of a planar center region of the first main surface.

8. The cutting insert according to claim 7 wherein the recesses are defined by respective flats formed in the first main surface, and declined at an angle from the center region.

9. The cutting insert according to claim 7 wherein the relief surface is coplanar with the planar center region.

10. The cutting insert according to claim 1 wherein the side surface structure comprises the at least one projection comprising at least three projections, wherein at least three of the side surfaces constitute rake surfaces, and at least three of the side surfaces constitute support surfaces, and wherein each rake surface is disposed between two support surface.

11. The cutting insert according to claim 10 wherein the rake surfaces alternate with support surfaces around the periphery of the insert, wherein support surfaces located closest to each other form an angle greater than ninety degrees and less than one hundred eighty degrees.

12. The cutting insert according to claim 1 having a basic shape of a square with beveled corners, as viewed in a direction perpendicular to the first main surface.

13. The cutting insert according to claim 1 wherein the rake surface forms an acute angle of less than ninety degrees with the relief surface.

14. The cutting insert according to claim 13 wherein the acute angle is in the range of 70°–80°.

15. The cutting insert according to claim 1 wherein the second main surface is shaped correspondingly to the first main surface.

16. The cutting insert according to claim 15 wherein the rake faces associated with the first and second main faces, respectively are separated by a central face segment extending perpendicularly to the planes of the first and second main surfaces, wherein each rake face forms an acute angle with the plane of the respective first and second main surface.

17. The cutting insert according to claim 6 wherein an intersection between the at least one projection and each recess is curved as viewed in a direction perpendicular to the first main surface.

18. The cutting insert according to claim 17 wherein the curved intersection is convexly curved.

19. The cutting insert according to claim 1 wherein the insert is formed of cemented carbide.

20. A tool comprising a holder having at least one seat and a cutting insert disposed in the seat, the seat including a main stop face and two additional stop faces upstanding from the main stop face and together forming an angle in the range of 45°–135°, the cutting insert comprising first and second polygonally-shaped main faces arranged substantially parallel to one another, and a side face structure interconnecting the first and second main faces to define therewith a peripheral edge, at least the first main face including at least one projection extending to the peripheral edge, the insert mounted in the holder wherein:

the second main face of the insert defining a support surface in contact with the main stop face, two mutually angled portions of the side face structure defining support surfaces in contact with the two additional stop faces, respectively, a portion of the first main face of the insert being arranged to define a relief surface, a portion of the side face structure arranged to define a rake surface, and a portion of the peripheral edge disposed at an intersection of the rake face and the relief face being arranged to define a cutting edge.

21. The tool according to claim 20 wherein the holder has only a single seat.

22. The tool according to claim 20 wherein the holder comprises a cylindrical milling holder, there being a plurality of seats spaces circumferentially apart around an outer periphery thereof, there being a cutting insert in each seat.

* * * * *